April 18, 1950     H. K. WEISS     2,504,167
GUN FIRE DIRECTOR SIMULATOR
Filed July 27, 1945     3 Sheets-Sheet 1
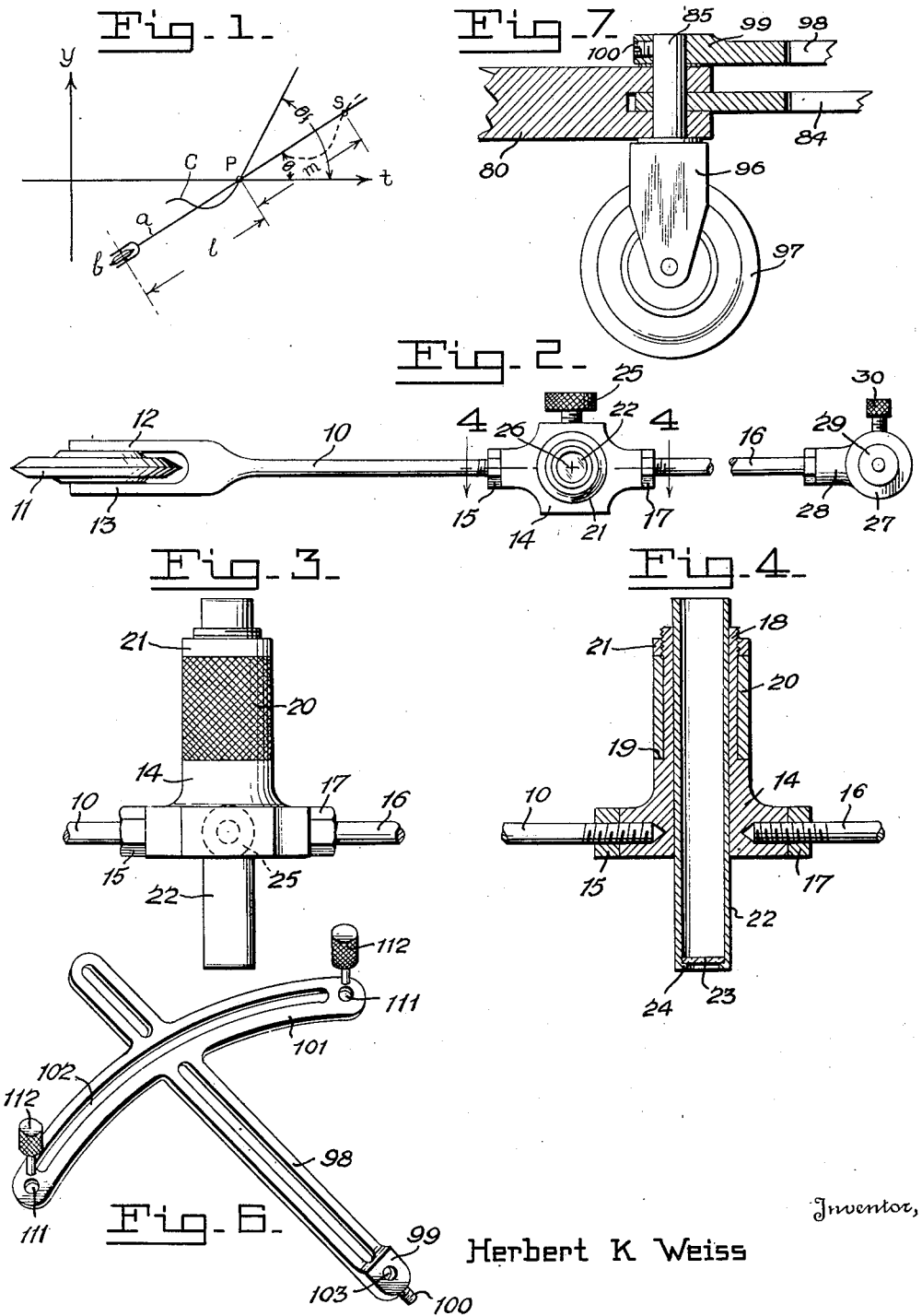
Inventor,
Herbert K. Weiss
By J. H. Church & H. E. Thibodeau
Attorneys.

April 18, 1950 H. K. WEISS 2,504,167
GUN FIRE DIRECTOR SIMULATOR
Filed July 27, 1945 3 Sheets-Sheet 2

Inventor
Herbert K. Weiss
By J. H. Church & H. E. Thibodeau
Attorneys

April 18, 1950      H. K. WEISS      2,504,167
GUN FIRE DIRECTOR SIMULATOR
Filed July 27, 1945      3 Sheets-Sheet 3
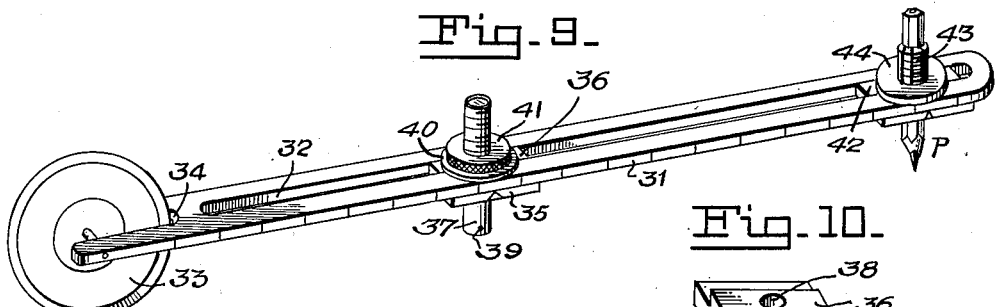
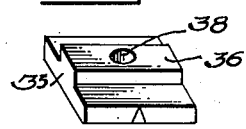
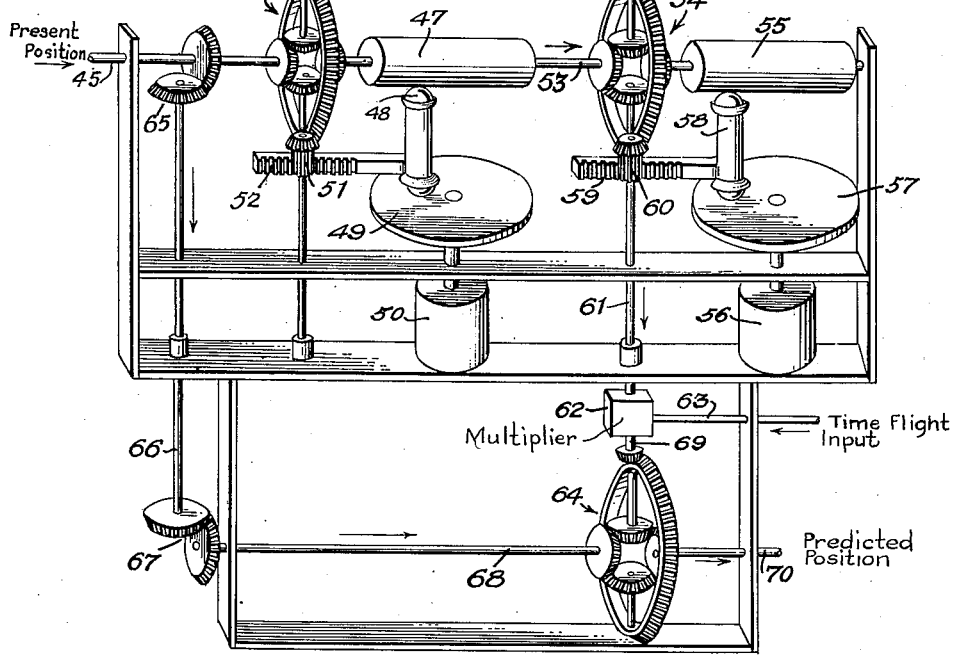
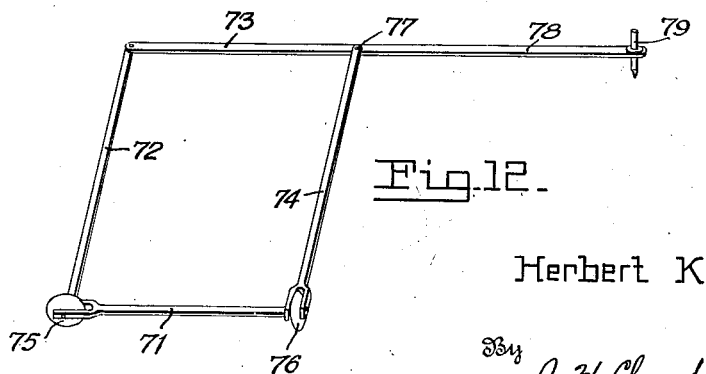
Inventor
Herbert K. Weiss
By J. H. Church & H. E. Thibodeau
Attorneys Patented Apr. 18, 1950

2,504,167

UNITED STATES PATENT OFFICE 2,504,167

GUNFIRE DIRECTOR SIMULATOR

Herbert K. Weiss, Fort Bliss, Tex.

Application July 27, 1945, Serial No. 607,478

10 Claims. (Cl. 33—27)

(Granted under the act of March 3, 1883, as amended April 30, 1928; 370 O. G. 757)

The invention described herein may be manufactured and used by or for the Government for governmental purposes without the payment to me of any royalty thereon.

In gun fire directors used at the present time, the rate of angular movement of the target as viewed from the gun position, is multiplied by the time of flight of the projectile, to give a product equal to lead. To this is added present position from an arbitrarily selected datum or base line, to give predicted position. In modern directors so-called "aided tracking" is used, wherein the sighting instruments used to establish lines of sight to the target, are driven by variable speed drives under the control of the observer. Numerous arrangements of variable speed drives are known. For example, in one type, adjustment to vary the rate of angular movement of the sight line, also directly adds or subtracts a proportional increment of adjustment to the sight line, whereby the tendency to overadjust the rate mechanism or "overshoot" is minimized.

However the sight lines are driven, the control is subject to the error of the person adjusting the controls so that tracking errors are being constantly introduced. In view of the fact that angular rate is but one of the factors introduced into, and combined by the director, tracking errors are modified and amplified so that it is not possible to determine directly how a certain tracking error will affect a certain director, or by what value it will cause the final output of the director to vary from the correct lead under the instantaneous conditions of fire.

In testing a tracking device of the aforesaid nature, a record is obtained in the form of a series of points defining a curved line wherein abcissaes represent time and ordinates represent the tracking error. However, because of the fundamental characteristics of all directors, as previously explained, it is not possible to tell from visual inspection of the curve, how any given error would affect the actual corresponding position of the gun. While it is possible to compute the effect of a given tracking error upon gun position, such methods are long and involved and require much time and a high degree of mathematical skill.

I have found that it is possible to provide a mechanical device that by suitable modifications may be adapted to most types of directors known and used at the present time, whereby, merely by following a tracking error curve prepared from that director, the corresponding prediction errors may be directly measured and plotted.

The foregoing paragraph indicates the general purpose of the invention. But more specifically, it is a purpose of the invention to provide an instrument for use with tracking error curves prepared from gun fire directors wherein the corresponding prediction or gun-laying error may be obtained directly.

A further object is to provide an instrument conveniently of the planimeter type, wherein a curve may be obtained and drawn, giving the prediction error for each corresponding value of tracking error.

Another object is to provide an instrument as in the preceding paragraph wherein the prediction error curve may be drawn merely by moving a part of the instrument to follow the tracking error curve.

A still further object is to provide an instrument as in the preceding paragraphs, that is adjustable for various selected times of flight of the projectile and that may be readily adapted for use with various known types of directors.

Other objects and advantages will become apparent as the description proceeds.

In the drawing:

Figure 1 is a diagrammatic view showing the principle upon which my director simulator operates.

Figure 2 is a plan view of a single stage instrument corresponding to the form shown at Figure 1.

Figure 3 is an enlarged side elevation of the tracing point structure used with the instrument of Figure 2.

Figure 4 is a section taken upon the line 4—4, Figure 2, and showing the sight tube, finger piece and rod connections.

Figure 7 is a sectional view, taken upon the line 7—7, Figure 5, and showing the pivot joint at the second pilot wheel and the connections by which said wheel is controlled by the control arm.

Figure 8 is an enlarged section taken substantially upon the line 8—8, Figure 5, showing the pivot joint at the tracer point and the optical device for aiding in accurately following the tracking error curve.

Figure 9 is a perspective view of a second modification operating upon the same principle as the species of Figures 2, 3 and 4.

Figure 10 is a detail perspective of one of two slides used in the modification of Figure 9.

Figure 11 is a perspective view of a two-stage rate smoother together with mechanism giving a final output of predicted position.

Figure 12 is a schematic view of an instrument according to my invention and constructed to simulate the action of the smoother of Figure 11.

Figure 5:
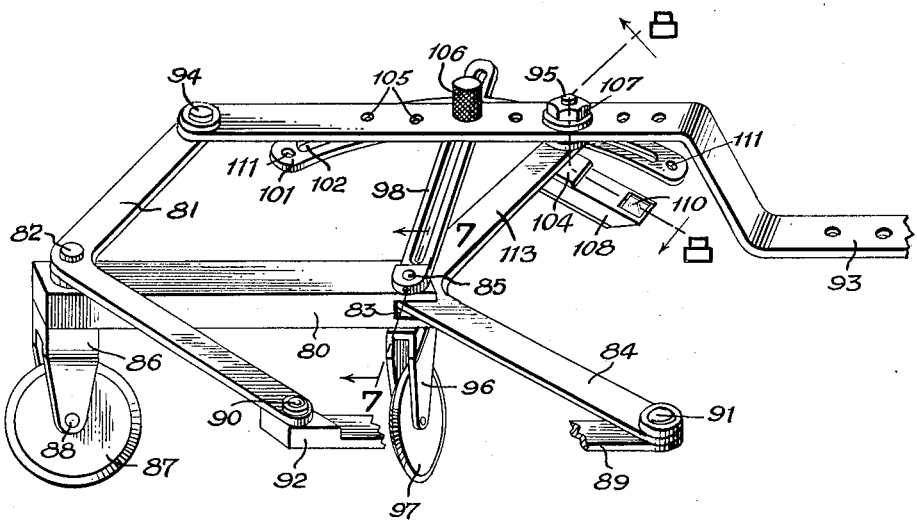
Figure 5 is a perspective view of a form of the invention simulating the action of a two-stage mechanical smoother and embodying an adjustment for varying the time of flight effect upon the prediction curve, and optical means for aid in following the tracking error curve.

Referring to Figure 1, let $l$ equal the length of arm $a$, from the point of contact of tracing wheel $b$ to the tracing point P, it being understood that point P is fixed on arm $a$, and that the distance $l$ corresponds to the time constant or smoothing time of the director whose action is to be simulated. For convenience of explanation the instantaneous position of point P is shown upon the axis of abscissae. Let $\theta$=the angle that arm $a$ makes with the $t$-axis, and $\theta_f$=the angle whose tangent is $dy_1/dt$ or the slope of the tracking error curve at point P.

Then it is evident that motion of tracking point P in the direction of arm $a$, will cause pure rolling of the wheel $b$, while motion of point P in a direction perpendicular to arm $a$ will result merely in rotation of the arm about the point of contact of wheel $b$. As point P moves an increment $ds$ along error curve C in the direction $\theta_f$, the arm will rotate through a small angle $d\theta$, defined by $$ld\theta = ds \sin(\theta_f - \theta) \quad (1)$$

Substituting the values $$dy_1 = ds \sin \theta_f; \; dt = ds \cos \theta$$

and $$\sin(\theta_f - \theta) = \sin \theta_f \cos \theta - \cos \theta_f \sin \theta$$

in (1), the equation becomes $$ld\theta = \cos \theta \, dy_1 - \sin \theta \, dt \quad (2)$$

If the scale relations of the instrument are chosen so that $\theta$ remains small, say less than 20°, so that $\sin \theta$ and $\cos \theta$ can be given values of 0 and 1 respectively, without appreciable error, upon division of (2) by $dt$, there results a general equation of the form $$\frac{dy_1}{dt} = l\frac{d\theta}{dt} + \theta \quad (3)$$

It should be noted that in deriving Equation 3 the only limitation is upon the angle made by arm $a$ with the $t$-axis. The slope of the error curve is not limited, and may have any value from 0 to 90° positive or negative.

As an example of use of the single-stage instrument, one standard type of director used at the present time, and known as the M5, employs aided tracking with a time constant of $1/7$ second. That is, the instrument is so designed as to base its instantaneous angular rate input upon the average value of the actual rates over a period of $1/7$ second. In this director, the sides of a differential are connected to a hand wheel and the sight respectively while the center is connected to be driven by the output of a variable speed drive controlled by the adjustment of said handwheel. The adjustment of the handwheel therefore corresponds to the rate of angular movement of the sight and is accordingly introduced into a computer where it is multiplied by the time of flight of the projectile, to give lead. The resulting value of lead is added to present position as determined by the sight, to give future predicted position. This may be expressed by the equation $$\epsilon_p = \sigma + e_0 \quad (4)$$

where $\epsilon_p$ is the predicted lead, $e_0$ is the present position angle and $\sigma$ is the angular rate multiplied by time of flight. A comparison of Equations 3 and 4 discloses their similarity. Thus $\epsilon_p$ corresponds to $$\frac{dy_1}{dt}; \frac{d\theta}{dt}$$

to $l\theta'$ and $e_0$ to $\theta$.

The slope of arm $a$ corresponds to the rate or angle of adjustment of the rate handwheel of the M5 director. Hence it is necessary only to extend this arm beyond the tracing point P, by a distance corresponding to time of flight measured in the scale of the time axis, to have the vertical displacement of the point $s$ above the point P equal to prediction error. As the point P or tracking point is itself displaced vertically by an amount equal to the present position error, the total displacement of the point $s$ above the zero axis is the full prediction error for the corresponding point on the tracking error curve beneath point P. Thus, by properly selecting and relating the lengths of the arms of the instrument to the scales of the tracking error curve, the director prediction error corresponding to any point upon the tracking error curve, can be determined.

At Figures 2, 3 and 4, I have shown an embodiment of my invention patterned upon the diagram of Figure 1. A rod section 10 corresponding to arm $a$, Figure 1, has a forked end with a planimeter wheel 11 journaled between the tines 12 and 13 of the forked end of section 10. The other of section 10 is threaded into a flange of a sleeve 14 and is held in adjusted position by means of a lock nut 15. A second rod section 16 is threaded into the flange of sleeve 14 and held in position by a lock nut 17. From Figure 2 it will be noted that the sections 10 and 16 are in alignment.

The sleeve 14 may have a reduced upwardly-extending threaded portion 18, forming a shoulder 19. A second collar 20 that may be knurled, as shown at Figure 3, rotatably fits reduced portion 18 and is held against axial movement thereon by a nut 21. A sighting tube 22 slidably fits within sleeve 14. This tube has its lower end flanged inwardly as at 23, Figure 4, to receive a crystal or lens 24 having crossed lines or a center point 26 marked or scored thereon. The point thus indicated lies upon the axis of the sleeve 14. A set screw 25 is threaded into the flange of sleeve 14 and engages tube 22 to hold the tube in vertically-adjusted position within and along said sleeve.

The outer end of rod section 16 is threaded into a lug 28 extending laterally from the side of a cylinder 27. The cylinder is of the proper internal diameter to receive any desired stylus or scribing means, such as a pencil 29 held in position by a set screw 30.

In use, the device is adjusted so that the distance between point 26 and stylus or scriber 29 corresponds to time of flight measured in the time scale of the chart bearing the tracking error curve. The instrument is adjusted so that when the scriber or stylus is in contact with the chart surface, the end of tube 22 has a small clearance. The instrument is positioned so that the point 26 lies above the starting point upon the error curve such as C, Figure 1, with the common axis of sections 10 and 16 substantially tangent to the curve. Collar 20 is then grasped between the thumb and forefinger and so moved as to guide point 26 along the error curve. The resulting curve traced by the scriber will give the corresponding prediction error curve as previously explained.

Figure 9 shows a second modification, operating upon the same principle as that of Figures 2, 3 and 4, and having an arm 31 provided with a slot 32. A planimeter-type wheel 33 is journaled within the forked end 34 of arm 31. A bearing block 35 is shaped as shown at Figure 10, to have a central ridge 36 fitting slot 32. A sighting or tracing tube 37 is secured within an aperture 38 in block 35, as by shouldering or threading. The lower end of tube 37 has cross-wires 39 to form a tracing point. The upper end of tube 37 is threaded and receives a washer 40 and a knurled nut 41. As the ridge 36 is of somewhat less height than the thickness of arm 31, tightening of the nut clamps tube 37 in adjusted position along slot 32. If desired, a scale may be formed along an edge of arm 31, for coaction with an indicator mark upon block 35 to determine the exact position of said block along the arm.

A second block 42 may be identical with block 35 and accommodate a threaded split tube 43 having a bore to snugly receive a scriber such as a pencil P so that, when nut 44 is turned down, the pencil is clamped in position by the split end of tube 43 and, at the same time block 42 is fixed in adjusted position along arm 31. Adjustment is facilitated by an indicator mark on block 42, cooperating with the scale on arm 31. The principle of operation of this modification is identical with that of Figures 2, 3 and 4. These instruments are known as single stage director simulators.

In some directors such as the M5, the time constant is small—a fraction of a second only. The length of the time of flight arm $m$ corresponding to such a small time interval as represented by the distance $l$ may be so long as to cause the instrument to be excessively sensitive in operation exactly as in the case of the director itself. To overcome this difficulty, the time of flight arm may be made a fraction, say one-tenth, of the length that would be required were its effective length in true proportion to the other dimensions of the instrument and chart. Such a change makes the instrument easier to handle but the values of prediction error are then no longer to the same scale as the present position errors so that the two cannot be directly added. The difficulty can be overcome by reading off the ordinates of prediction error corresponding to successive points upon the tracking error curve, multiplying them by the proper ratio, and plotting the resulting values either upon the same or a different chart. If a different chart is used, the values plotted will, of course, be the sum of the observed and prediction errors.

Thus, the single stage instrument disclosed may be used to simulate the action of any director having corresponding characteristics, merely by properly adjusting the relative effective lengths of the two arm sections and properly correlating said lengths with the scale of error curve. In this respect, the species of Figure 9 is particularly desirable since the effective distances can be varied to suit different scales and different directors.

Improved types of directors, such as the M7B1 and T38, employ two-stage mechanical smoothers wherein two variable speed drives are combined to smooth variations in input rate to give a smoothed average rate which is then multiplied by time of flight. The resulting product is then added to present position as a measure of future predicted position. Various arrangements and relations between the two stages are known. For example, the two may be connected in series, so that the output of one is directly connected to the input of the succeeding stage. Such an arrangement is shown in Figure 11, where 45 indicates the input shaft to differential 46 of the present observed target position. The drum 47 of a first smoother stage is connected with a second side of differential 46 and is driven by a ball cage 48 one ball of which is in engagement with disc 49 driven at constant speed by motor 50.

Cage 48 is moved radially over disc 49 by movement of the center of differential 46 operating through a pinion 51 and a rack 52 attached to the cage. The cage is thus moved radially so that the speed of drum 47 at all times matches that of input shaft 45.

The output shaft 53 is driven by drum 47 and operates one side of a second differential 54 having its other side connected to the drum 55 of the second smoother. This second smoother includes a constant speed motor 56, connected to drive a disc 57. Disc 57 in turn drives drum 55 through a ball carriage 58 adjusted radially of disc 57 by a rack 59. Said rack in turn, is driven by a pinion 60 operated by the center of differential 54. The shaft 61 is also connected to be driven by said center and extends into a multiplier 62 having a second input shaft 63 actuated in accordance with time of flight. The present position values are conveyed from shaft 45 to one side of a differential 64, by way of gears 65, shaft 66, gears 67 and shaft 68. Another side of differential 64 is driven by the output shaft 69 of multiplier 62. As shaft 69 is driven proportional to the product of the average target rate and time of flight, the output from differential 64 over shaft 70 is proportional to future predicted position of the target.

The structure just described in connection with Figure 11 is well known and is included merely to illustrate the analogy between such a structure and an instrument constructed according to the invention. A simple type of such an instrument is shown in Figure 12, where an arm 71 has a forked end within which is journaled a planimeter wheel 75. A second arm 72 is pivotally connected at one end with the forked end of arm 71, and at its other end with a third or tracer and scriber arm 73. A fourth arm 74, has a forked end within which a planimeter wheel 76 is journaled. This end is pivotally connected with the end of arm 71 remote from wheel 75. The other end of arm 74 is connected to arm 73 at a tracer point 77. The four points of pivotal connection form a parallelogram and arm 73 is extended at 78 to carry a scriber or stylus 79 at its end.

In operation, point 77 is caused to follow the plotted curve of present position error and point 79 corresponding to the predicted point, traces a curve of prediction error. The rate used in prediction is represented by the slope of the first or follower arm 71 and this slope is analogous to the rate of movement of shaft 69. As such slope is transferred to tracer arm 73, the resulting curve will have as ordinates, the prediction error for the corresponding points of the present position error curve. By "corresponding point" is meant the location of the scriber 79 at the instant that the tracer 77 is over a given point on the present position error curve. The lengths of the arms 71, 73 and 76 are determined in any given instrument by the constants of the director for use with which the instrument is intended, as well as the scale of the curve.

While the instrument schematically shown at Figure 12 is entirely operative, it corresponds only to a smoother that is aperiodic or overdamped. Modern two-stage smoothers in use at the present time are, however, underdamped so that they "overshoot" slightly in approaching a new position. Thus, for accuracy, it is desirable to provide an instrument that simulates the action of an underdamped smoother. Such an instrument is shown at Figures 5 to 8, inclusive.

In these figures, the numeral 80 represents a main bar having a bell crank 81 pivoted at one end of bar 80 as by a pivot 82. The arms of bellcrank 81 may conveniently, but not necessarily, be mutually normal. The end of bar 80 opposite pivot 82 is slotted as at 83 to receive the central portion of a second bell crank 84 pivoted thereto by a pivot 85. The bar 80 has a bearing bracket 86 fixed thereto and within which a wheel 87 of the planimeter type, is journaled upon a normally horizontal axis fixed perpendicularly to the bar, as by axle 88.

Two corresponding ends of bellcranks 81 and 84 are pivotally connected to the respective ends of a link 89 by pivot pins 90 and 91. One end of link 89 is thickened as at 92 to compensate for the vertical offset between bellcranks 81 and 84. It will be understood that pivots 82, 85, 90 and 91, form a parallelogram. Likewise the other corresponding ends of bellcranks 81 and 84 are interconnected by tracer arm 93, as by pivots 94 and 95, to form therewith a parallelogram. The bellcrank arms connected by link 89, are provided to give balance and stability to the instrument and to eliminate lost motion. However, these parts may be dispensed with if desired.

Figure 6:
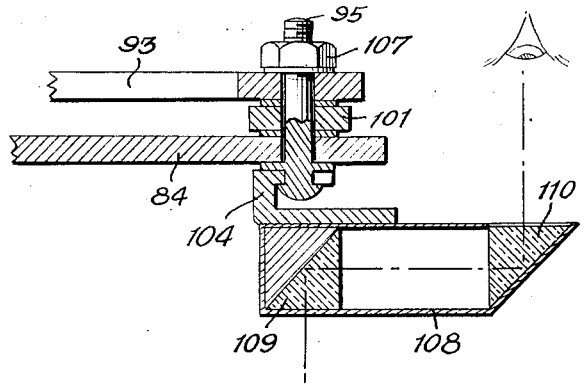
Figure 6 is an enlarged perspective view of the control arm used for controlling the second pilot wheel in the species of Figure 5.

The pivot pin 85 is journaled within main bar 80 and bellcrank 84 is pivoted thereon. The lower end of said pin is fixed to a bracket 96 that, in turn, rotatably mounts a planimeter-type wheel 97. The upper end of pin 85 is fixed to a control arm 98. As shown at Figure 6, this arm may have a thickened hub portion 99, provided with a set screw 100, and arcuate portion 101 having a slot 102 concentric of the hole 103 receiving pivot 85. Thus the angular position of the axle of wheel 97 relatively to that of wheel 87, is determined by the angular relation between bar 80 and control arm 98.

As shown at Figure 8, the pivot 95 includes a bolt having a head, grooved to receive the slotted end of a bracket 104. The bolt passes through slot 102 so that arm 98 may pivot freely on the axis determined by pivot 85. A series of holes 105 is drilled in and along arm 93 and a pin 106, having a knurled head is formed to fit any selected hole and to project downwardly to make a snug sliding fit within the slot in arm 98. In this manner the initial angular relation between arm 98 and the adjacent arm 113 of bellcrank 84, may be adjusted. A nut 107 serves to hold pivot bolt 95 in position.

A casing 108 is secured to bracket 104 and carries a pair of prisms 109 and 110 whereby the point determined by the intersection of the axis of bolt 95 with the supporting surface, may be determined by looking downwardly upon prism 110 having a tracking point indicated thereon in any suitable manner. The slotted bracket 104, enables the prism reading device to be removed when the instrument is not in use.

Arm 93 may extend outwardly for any selected distance and may have a support or rest, not shown, adjacent its outer end. A series of pencil-receiving holes may be formed in the arm, spaced at various time of flight intervals. Alternatively, a slide carrying a pencil or stylus, may be formed to slidably engage arm 93 and to be secured thereto in adjusted position. Holes 111 are formed in the ends of arcuate portion 101. Finger grips 112 are removably positioned in these holes whereby to facilitate operation of the instrument by pivoting of arm 98 and wheel 97 to thereby cause the axis of pivot 95 to traverse successive points upon the plot of observed error.

The holes 105 are intended to change the time of flight effect upon smoothing and it will be noted that, under all conditions of adjustment, the axes of wheels 87 and 97 are parallel when bar 80, and arms 93 and 98 are superposed and parallel. Furthermore, it will be noted that when pin 106 is located in a hole 105 that is between pivots 94 and 95, that the angular relation of arm 98 to main bar 80 is always greater than the corresponding relation of adjacent arm 113 of bellcrank 84. Arm 93 is maintained parallel to bar 80 at all times by the parallelogram linkage, and, since wheel 87 has its axis angularly fixed relatively to bar 80 and thus, to arm 93, the rate of change of the angular relation of arm 93 to the axis of the abscissas of the chart or plot varies with the angular relation of arm 98 to bar 80. This condition corresponds to an underdamped smoother in which the instrument tends to overshoot in approaching a new steady position. On the other hand, positioning pin 106 in a hole on the side of pivot 95 opposite to pivot 94, causes the angular relation of arm 98 to be at all times less than arm 113 and corresponds to an overdamped smoother in which the instrument undershoots in approaching a new steady state. An adjustment in which the arm 98 is maintained parallel to arm 113 corresponds to an aperiodic instrument similar in function to the instrument of Figure 12.

It is thus possible to simulate the action of any multi-stage smoother and to derive from a plot of present position error a curve giving the corresponding errors of predicted position for any time of flight corresponding to the adjustment of a scriber or stylus along arm 93. Not only does the resulting curve enable an analysis of the actual operation of the simulated smoother, and the weight that it gives successive input values, but also, comparison of curves or families of curves prepared for any two smoothers, enables a critical analysis and comparison of their characteristics and operation and a determination of which smoother more nearly approaches an assumed or theoretically optimum.

Having now fully disclosed the invention, what I claim and desire to secure by Letters Patent is:

1. In a plotting instrument, a bar, a first supporting wheel journaled upon said bar on a first axis fixed perpendicularly thereto, a second supporting wheel journaled upon said bar on a second axis movable angularly to said first axis, said axes being at all times coplanar, a control arm fixedly connected to said second wheel to control the angle thereof relatively to said bar, a tracer arm, a pivotal connection between said arms, and means maintaining said bar and tracer arm in parallelism.

2. A director simulator comprising a bar, a first bracket fixed to said bar, a planimeter-type wheel journaled in said bracket upon an axis having a predetermined fixed angular relation to said bar, a second bracket pivoted on said bar upon a normally vertical axis, a second planimeter-type wheel journaled in said second bracket, a control arm connected to said second bracket to control the angular relation of the axis of said second wheel to that of said first wheel, a tracer arm having means defining a tracing point and a plotting point, a pivotal connection between said arms, and means maintaining said bar and tracer arm in parallelism.

3. In an instrument for plotting points upon a prediction error curve from a plot of tracking error for a director, a bar, first and second arms pivoted on said bar upon spaced parallel first and second axes, respectively, said axes being perpendicular to said bar, a first wheel, first means mounting said first wheel for rotation upon a third axis normal to and intersecting said first axis, a second wheel, second means pivoted on said second axis and mounting said second wheel for rotation on a fourth axis normal to and intersecting said second axis, a control arm fixed to said second means to control the angular relation of said fourth axis relatively to said third axis, a tracer arm pivoted to said first and second arms on axes defining a parallelogram with said first and second axes, a pin fixed in said tracer arm and slidably connected with said control arm, and means adjustable on and along said tracer arm to define a plotting point.

4. In a plotting instrument, a bar, a tracer arm, means connecting said bar and arm to form opposed sides of a deformable parallelogram, first wheel means supporting said bar at one end thereof for translation along the axis of said bar, second wheel means pivoted on said bar, means connecting said arm and second wheel means to change the angular relation of the axis of said second wheel means relatively to said bar and first wheel means in response to change in the lateral separation of said bar and arm, and means on said arm defining a plotting point.

5. In a prediction error curve plotter, interpivoted link means forming a deformable parallelogram and including a bar and arm forming opposite sides of said parallelogram, spaced first and second planimeter type wheels supporting said bar, said first wheel being rotatable on an axis fixed normal to said bar, said second wheel being steerable to effect combined translation and rotation of said bar and arm, means interconnecting said arm and second wheel to vary the steering angle of said second wheel in response to the lateral separation of said bar and arm, and means on said arm defining tracing and plotting points, spaced longitudinally therealong.

6. In an instrument for plotting prediction error curves, a bar, first and second bellcranks pivoted upon said bar on spaced parallel axes normal thereto, a link pivotally connecting corresponding arms of each bellcrank to form with said bar and arms a parallelogram, a tracer arm pivotally connecting the remaining arms of said bellcranks, said tracer arm, link and bar being parallel, a bracket fixed to said bar, a first supporting wheel journaled in said bracket for rotation upon an axis fixed perpendicularly of said bar and the pivot axis of said first bellcrank, a second bracket pivoted coaxially with the axis of said second bellcrank and having a second supporting wheel journaled therein on an axis normal to said second bellcrank axis, a control arm secured to said second bracket and crossing said tracer arm, pivot means adjustably fixed along said tracer arm and slidably engaging said control arm, the pivot axis of said tracer arm and second bellcrank adjacent said control arm, forming a tracing point, said tracer arm being adapted to hold a stylus at predetermined points therealong.

7. In the instrument according to claim 6, bolt means pivotally connecting said tracer arm and the adjacent second bellcrank arm to define the pivot axis therebetween, and a prism viewing device detachably carried by said instrument beneath said bolt means to visualize from a position offset therefrom, the intersection of said pivot axis and supporting surface.

8. In the instrument according to claim 6, said control arm having an arcuate portion with a slot concentric of the pivot axis of said second bracket on said bar, and bolt means pivotally connecting said tracer arm and the adjacent end of the arm of said second bellcrank, to define the pivot axis therebetween, said bolt means passing through said concentric slot.

9. In an instrument for determining points upon a prediction error curve from corresponding points upon a curve of tracking error, a tracer arm having a fixed tracer axis and means longitudinally spaced along said arm to support a scriber, a bar, a first wheel supporting said bar at one end and having its axis fixed in transverse relation therewith, a second wheel supporting said bar at its other end and connected therewith for pivotal movement about an axis normal to said bar and the axis of said first wheel, means connecting said arm and bar for movement in parallelism toward and from each other, and means operable to pivot said second wheel in response to change in separation of said bar and arm.

10. In an instrument for describing a prediction error curve from tracking error curve for a known director, an arm having means thereon defining a tracing point and a plotting point longitudinally spaced from said tracing point, a bar, means connecting said arm and bar in parallel, side-by-side relation for movement toward and from each other, a first wheel supporting said bar at one end and journaled on an axis in fixed transverse relation with said bar, a second wheel supporting said bar at the other end thereof and pivotable thereon to change the angular relation of the journal axes of said wheels, connecting means operable to pivot said second wheel relatively to said bar, in response to change in separation of said arm and bar, and means manually operable independently of said connecting means to change the angular relation of the axis of rotation of said second wheel relatively to said bar.

HERBERT K. WEISS.

REFERENCES CITED

The following references are of record in the file of this patent:

UNITED STATES PATENTS

| Number | Name | Date |
| --- | --- | --- |
| 752,470 | Schierbeck | Feb. 16, 1904 |
| 1,282,020 | Anderson | Oct. 22, 1918 |
| 1,380,754 | Van Bogaert | June 7, 1921 |
| 2,300,326 | Wesleysmith | Oct. 27, 1942 |

FOREIGN PATENTS

| Number | Country | Date |
| --- | --- | --- |
| 84,930 | Switzerland | Apr. 16, 1920 |
| 141,636 | Great Britain | Apr. 22, 1920 |